A. J. MEYER.
TURRET INDEXING AND LOCKING MEANS.
APPLICATION FILED DEC. 18, 1916.
1,317,884.
Patented Oct. 7, 1919.
2 SHEETS—SHEET 1.
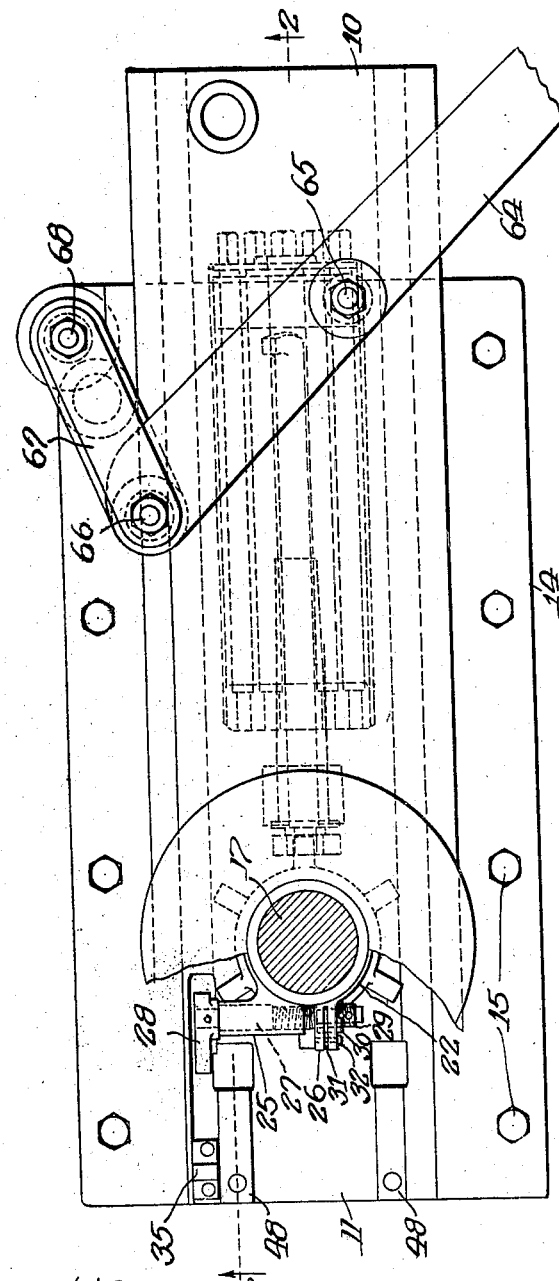
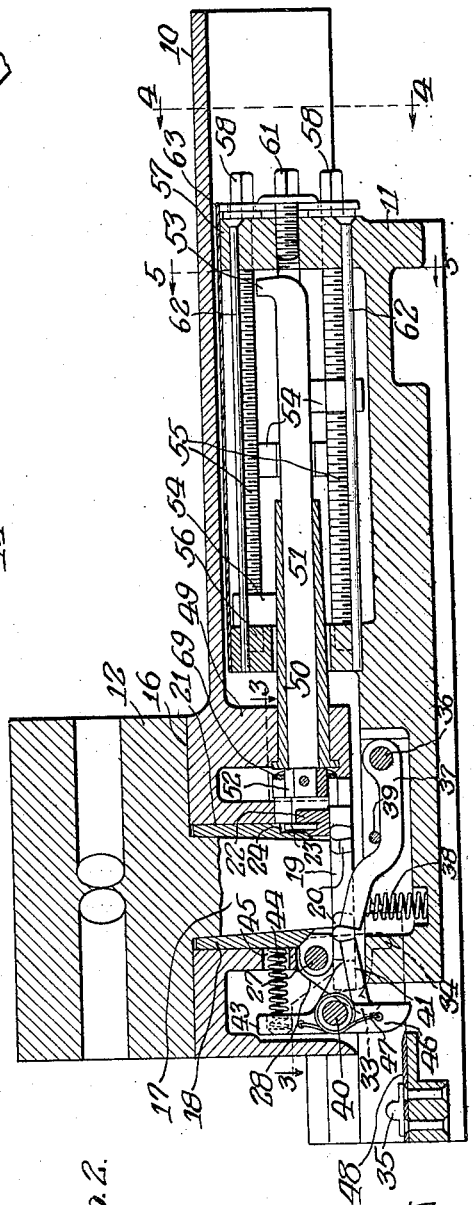
Witnesses
Inventor
August J. Meyer
By Albert C. Bell
Atty A. J. MEYER.
TURRET INDEXING AND LOCKING MEANS.
APPLICATION FILED DEC. 18, 1916.
1,317,884.
Patented Oct. 7, 1919.
2 SHEETS—SHEET 2.
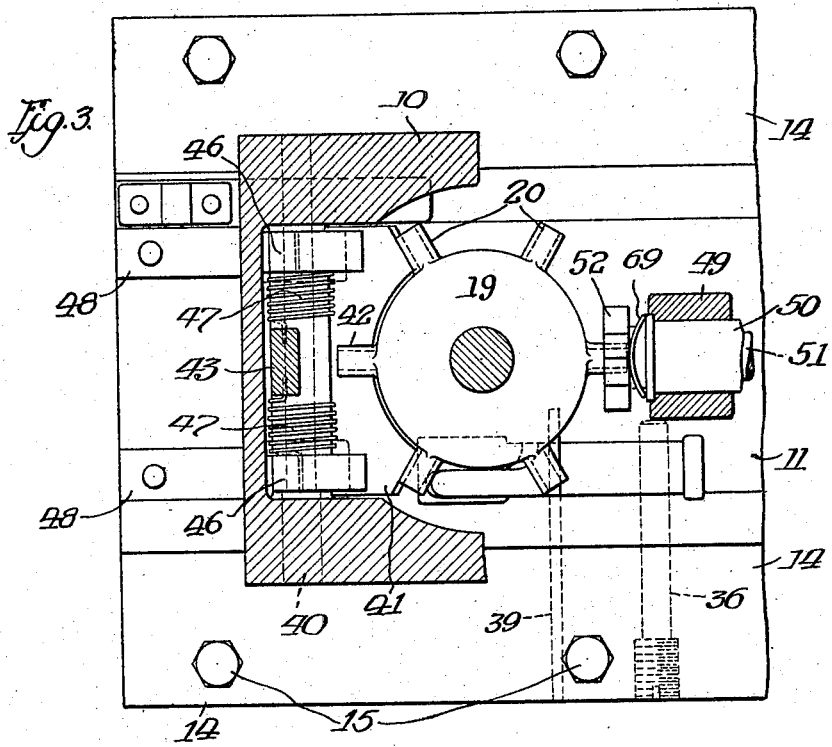
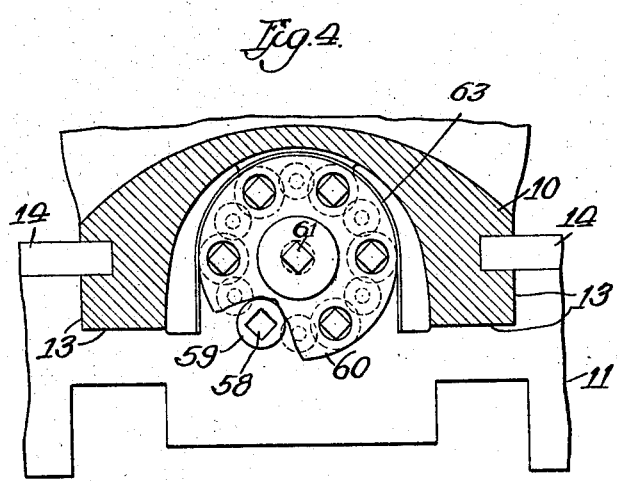
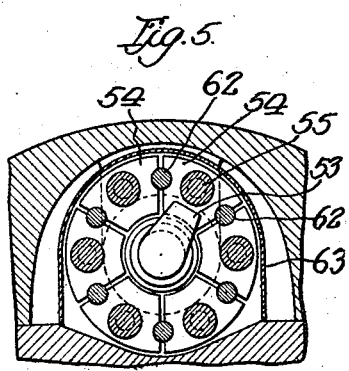
Witnesses:
Inventor
August J. Meyer
By Albert C. Bell
Atty.

UNITED STATES PATENT OFFICE.

AUGUST J. MEYER, OF CHICAGO, ILLINOIS, ASSIGNOR OF ONE-HALF TO DAVID A. WRIGHT AND ONE-HALF TO WILLIAM E. PRATT, BOTH OF CHICAGO, ILLINOIS.

TURRET INDEXING AND LOCKING MEANS.

1,317,884.  Specification of Letters Patent.  Patented Oct. 7, 1919.

Application filed December 18, 1916. Serial No. 137,482.

*To all whom it may concern:*

Be it known that I, AUGUST J. MEYER, a citizen of the United States, residing at Chicago, in the county of Cook and State of Illinois, have invented a certain new and useful Improvement in Turret Indexing and Locking Means, of which the following is a specification.

My invention relates to an improved construction of turret mechanism for use on screw machines, by which the turret is positively rotated by each reciprocation of the same upon its support and held securely locked in each operating position of the machine. My invention also provides improved mechanism for limiting the motion of the turret toward the work for each operation, and also mechanism for securely clamping the rotatable turret upon its supporting slide during each working operation.

My invention will best be understood by reference to the accompanying drawings, showing a preferred embodiment thereof, which are as follows:

Figure 1 shows the turret supporting devices in top view, the turret being removed to show the clamping mechanism;

Fig. 2 is a sectional view of the parts shown in Fig. 1 taken along the line 2—2;

Fig. 3 is an enlarged sectional view of the parts shown in Fig. 2 taken along the line 3—3;

Fig. 4 is an enlarged sectional view of the parts shown in Fig. 2 taken along the line 4—4, and Fig. 5 is an enlarged sectional view of the parts shown in Fig. 2 taken along the line 5—5.

Similar numerals refer to similar parts throughout the several views.

As shown in the drawings, the turret construction consists of a slide 10 mounted to reciprocate on a saddle 11, the slide 10 in turn supporting a rotatable turret 12. As shown in Fig. 4 the saddle 11 is provided with finished bearing surfaces 13 engaging similar finished surfaces of the slide 10 to maintain the slide positively in alinement at all times. The saddle 11 is provided with gibs 14 the edges of which enter longitudinal slots in the slide 10 for receiving the same, said gibs being secured to the saddle 11 by cap screws 15 shown in Figs. 1 and 3.

The turret 12 has a finished lower surface 16 engaging a horizontal finished face on the upper portion of the forward end of the slide 10 and a projecting slightly tapered hub 17 extends from the lower face of the turret through the bearing sleeve 18 and has secured to its lower end a turning gear 19 provided with six equally spaced teeth 20. The sleeve 18 is provided with a tapered bore fitting the outer surface of the hub 17 and has an outer cylindrical surface fitting a corresponding bore 21 formed vertically through the forward end of the slide 10. The lower end of the sleeve 18 is beveled and in engagement with a clamping ring 22 resting upon the gear 19 and provided with a beveled upper surface fitting the lower end of the sleeve 18. The ring 22 is of slightly larger bore than the lower end of the hub 17 and carries an upwardly extending pin 23, the projecting end of which extends into a slot 24 formed in the outer surface of the sleeve 18, as a result of which, since the sleeve 18 is a relatively snug fit in the slide 10, the ring 22 is prevented from rotating relatively of the sleeve. The ring 22, as more clearly shown in Fig. 1, is split on its forward side and carries at its split ends bosses 25 and 26. The boss 25 is threaded near the split in the ring with left hand threads as indicated, for engaging similar threads formed on the inner end of a shaft 27 which extends through the boss 25 and has secured to its outer end an operating dog 28. The shaft 27 extends through the boss 26 and has rigidly secured to its inner end a sleeve 29 provided on its outer surface with right hand threads engaging similar threads in a sleeve 30 carried by the boss 26. The sleeve 29 is made separate from the shaft 27 so as to facilitate assembling the parts in place. The sleeve 30 is provided on its outer surface with left hand threads engaging similar threads formed in the boss 26, as a result of which construction when the shaft 27 is rotated in a clockwise direction, as seen in Fig. 2, the bosses 25 and 26 are separated and the ring 22 is opened to release the turret 12, and when the shaft 27 is rotated in a counter-clockwise direction, as seen in Fig. 2, the bosses 25 and 26 are forced toward each other, thus clamping the beveled surface of the ring 22 against the lower beveled surface of the sleeve 18, which tends to draw the turret down against the slide 10 and to force the sleeve 18 upward in the slide to take up any wear that may develop between the sleeve 18 and the hub 17. The sleeve 30 may be turned in the boss 26 to secure any desired adjustment of the ring 22, so that when the shaft 27 is operated by the dog 28 it will exert the desired degree of clamping action upon the sleeve 18 and the turret 12. The boss 26 is slotted as indicated in Fig. 1 at 31 and provided with a clamping screw 32 by means of which the sleeve 30 may be held in any desired adjustment.

The dog 28, as shown in Fig. 2, is provided with two downwardly extending teeth 33 and 34 for engaging an operating lug 35 rigidly secured to the front end of the saddle 11 in line with the dog 28, as a result of which when the slide 10 is moved forwardly the tooth 34 engages the lug 35 and rotates the shaft 27 in a counter-clockwise direction as seen in Fig. 2, thus clamping the turret securely upon its horizontal supporting surface in which position it is held during the operation. When the slide 10 is moved rearwardly for the next operation, the tooth 33 engages the lug 35, thus turning the shaft 27 in a clockwise direction which releases the turret 12 from the action of the clamping ring 22, so that the turret may be rotated in a manner to be described.

The saddle 11 is provided under the turret 12 and to one side of the center thereof with a horizontal pivoted rod 36 upon which is mounted an operating latch 37, the forward end of which is in line with the teeth 20 of the gear 19. A spring 38 between the saddle and the latch tends to hold the latch in a position so that its forward end lies in the plane of the gear 19, and a stop pin 39 carried by the saddle is provided to limit the upward motion of the latch 37 under the action of the spring 38. The lower portion of the forward end of the slide 19 carries a transverse horizontal rod 40 upon which a locking latch 41 is mounted. This latch, as more clearly shown in Fig. 3, is provided with slightly beveled ends and a correspondingly beveled central aperture 42 for engaging three of the teeth 20 when the teeth are in an angular position permitting the latch to move to its locking position. The latch 41 carries near the middle of its forward edge an upwardly extending lug 43 between which and the sleeve 18 carried by the slide 10, a spring 44 is disposed, which spring tends to move the latch to its locking position. A hole 45 is provided through the wall of the slide 10 outside of the sleeve 18 to receive the end of the spring 45 to hold it in place. The rod 40 carries near each end a releasing dog 46 located in a recess formed therefor in the locking latch 41, and each releasing dog 46 is provided with a downwardly extending arm and a rearwardly extending arm the latter resting over the end of the locking latch 41, as shown in Figs. 2 and 3. Light springs 47 are provided between the lug 43 of the locking latch and the releasing dogs 46 tending to hold the releasing dogs in the position shown in Fig. 2 against the ends of the locking latch. The downwardly extending ends of the releasing dogs 46 are in line with short steel plates 48 secured to the forward end of the saddle 11, the relation of the parts being such that when the slide 10 is moved forwardly the downwardly extending arms of the releasing dogs engage the plates 48, as a result of which the dogs are rotated upon the rod 40 in a counter-clockwise direction as seen in Fig. 2 without moving the locking latch 41 which at this time is in locking engagement with three of the teeth of the gear 19. When the slide 10 is moved rearwardly or away from the work to its position shown in Figs. 1 and 2, the downwardly extending arms of the releasing dogs 46 engage the plates 48 and are rotated thereby upon the rod 40 in a clockwise direction, thus moving the locking latch 41 downwardly against the action of the spring 44 to release the gear 19. Immediately after the gear 19 is thus released the forward end of the operating latch 37 engages the next tooth 20 of the gear 19 to that previously engaged by it and continued motion rearwardly of the slide 10 rotates the gear 19 and thus the turret 12. Just before the rotation of the turret is completed to bring the next tool carried thereby into operating position the downwardly extending arms of the releasing dogs 46 pass to the rear of the plates 48 and the spring 44 moves the locking latch 41 into engagement with the under surfaces of the teeth 20. When the slide 10 is moved to its extreme rearward position, the gear 19 completes its motion and for this condition its teeth are brought into alinement with the engaging surfaces on the locking latch 41 for which condition the spring 45 forcibly moves the locking latch into engagement with three of the teeth 20 as above referred to. The slightly beveled sides of the teeth and the correspondingly beveled surfaces of the locking latch serve to positively adjust the turret to its exact operating position and hold it there against rotation until the locking latch is again moved to its releasing position. For each forward motion of the slide 10 the tooth 20 of the gear 19 next to be engaged by the end of the operating latch passes over the same, thus depressing it against the action of the spring 38 and after the said tooth 20 has passed the latch, the latter moves into a position to engage said tooth on its return motion and produces the rotation of the turret above described.

The slide 10 is provided under the rear portion of the turret with a downwardly extending transverse web 49 which supports a horizontal bushing 50 extending longitudinally and centrally of the slide 10. The bushing 50 forms the bearing for a rotatable shaft 51 to the forward end of which is secured a pinion 52 the teeth of which are engaged by the teeth 20 of the gear 19 as it rotates. The pinion 52 is provided with six teeth as a result of which for each operation of the slide 10 the shaft 51 is rotated one-sixth of a complete turn. The rear end of the shaft 51 has formed on it a radially projecting hook 53 which, for each of its positions, is in line with one of the nuts 54 carried by the threaded rods 55. The rods 55, of which there are six, are supported at their forward ends in an upwardly extending flange 56 carried by the saddle 11 and at their rear ends by a similar flange 57 carried by the rear end of the saddle 11. The rods 55 are mounted in clearance openings in both of the flanges referred to and are held in place therein as follows: Each of the rods is squared at its rear projecting end as indicated at 58 and upon each of the squared ends, as more clearly shown in Fig. 4, a washer 59 is disposed which washer has a square hole fitting the squared end 58. A clamping disk 60 is provided which has six equally spaced clearance holes for the squared ends 58 and this disk is held in place against the washers 59 by a central clamping screw 61 supported by the flange 57. As a result of the construction described, when it is desired to move the nuts 54 to secure any desired adjustment of the slide for its successive operations, the screw 61 is released and the rods 55 are individually operated to move the stop nuts 54 to positions such that by engagement with the hook 53 on the shaft 51 they will permit the desired amounts of motion of the slide 10. When properly adjusted the screw 61 is tightened, which, by forcing the disk 60 against the washers 59, prevents rotation of said washers and therefore prevents rotation of the rods 55. As more clearly shown in Fig. 5, the stop nuts 54 have semi-circular grooves formed in their edges for engagement with the guide rods 62 to prevent the nuts turning on the rods 55 from the position indicated in Fig. 5. The rods 62 are supported by the flanges 56 and 57 and are provided at their rear ends with countersunk heads which are overlapped by the washers 59, as a result of which the said washers serve to hold the rods 62 in place in the flanges. To prevent longitudinal motion of the rods 55 in the flanges 56 and 57, the forward ends of the rods in their supporting holes and the shoulders formed by squaring the rear ends 58 of the rods are in line with the rear face of the flange 57 or slightly to the rear of said rear face, as a result of which, when the screw 61 is tightened, the stopping nuts are held positively in their stopping position.

The rods 55 and the parts associated therewith are preferably incased and protected by a thin sheet metal cover 63, so that, should the slide 10 be moved sufficiently to uncover the rear end of the saddle 11, it will still be impossible for foreign substances to come in contact with the rods 55 and parts associated therewith.

As shown in Fig. 1, a lever 64 pivotally connected at 65 to the slide and pivotally connected at 66 to a link 67, the other end of which link is pivotally connected to the saddle at 68, is provided for moving the slide and turret longitudinally of the saddle, although I do not limit myself to operating the slide in this manner.

From the above description it will be noted that the pinion 52 is free from the gear 19 during a portion of each rotation of the latter, and to insure that the pinion 52 shall not be accidentally displaced from its proper position during the intervals when it is not in engagement with the gear 19, I provide a spring washer 69 between the pinion and the end of the bushing 50 which, by its frictional engagement with the pinion, serves to hold it from the time it is engaged by one of the teeth 20 of the gear 19 until its engagement with the next one of said teeth.

While I have shown my invention in the particular embodiment above described, I do not however limit myself to this exact construction, as I may use any equivalents thereof within the scope of the appended claims known to the art at the time of filing this application, without departing from my invention.

What I claim is:

1. In a screw machine, the combination of a turret, a slide supporting said turret and permitting reciprocation thereof relatively to said slide, a ring for clamping said turret to said slide, a right and left hand screw carried by said ring for moving the same into clamping engagement, and devices for rotating said screw to clamp said ring for each operation of said slide to its working position.

2. In a screw machine, the combination of a slide, a turret resting upon said slide and having a vertically extending tapered hub projecting into said slide, a bushing carried by said slide around said hub to form a bearing therefor, a disk carried by the end of said hub, a split ring between said disk and said bushing, and devices for moving the ends of said ring together by the reciprocation of said slide to exert oppositely directed thrusts upon said bushing and said disk.

3. In a screw machine, the combination of a slide, a turret resting upon said slide and having a vertically extending tapered hub projecting into said slide, a bushing carried by said slide around said hub to form a bearing therefor, a disk carried by the end of said hub, a split ring having threaded ends between said disk and said bushing, a right and left hand screw extending through the threaded ends of said ring, and devices for rotating said screw by each reciprocation of said slide.

4. In a screw machine, the combination of a slide, a turret resting upon said slide and having a vertically extending tapered hub projecting into said slide, a bushing carried by said slide around said hub to form a bearing therefor, a disk carried by the end of said hub, a split ring having threaded ends between said disk and said bushing, a right and left hand screw extending through the threaded ends of said ring, an operating dog secured to said screw, and a stationary lug for engaging said dog to rotate said screw and clamp said ring for motion in one direction of said slide and for engaging said dog to turn said screw in the reverse direction for motion in the other direction of said slide.

5. In a screw machine, the combination of a slide, a turret resting upon said slide and having a vertically extending tapered hub projecting into said slide, a bushing carried by said slide around said hub to form a bearing therefor, a disk carried by the end of said hub, a split ring having threaded ends between said disk and said bushing, a right and left hand screw extending through the threaded ends of said ring, and devices for rotating said screw by each reciprocation of said slide, said ring and said bushing having beveled engaging surfaces whereby the ring when moved into clamping engagement tends to move the bushing in said slide to closely fit said hub and also holds said turret securely upon the supporting seat therefor carried by the said slide.

6. In a screw machine, the combination of a slide, a turret resting upon said slide and having a vertically extending tapered hub projecting into said slide, a bushing carried by said slide around said hub to form a bearing therefor, a disk carried by the end of said hub, a split ring having threaded ends between said disk and said bushing, a right and left hand screw extending through the threaded ends of said ring, an operating dog secured to said screw, and a stationary lug for engaging said dog to rotate said screw and clamp said ring for motion in one direction of said slide and for engaging said dog to turn said screw in the reverse direction for motion in the other direction of said slide, said ring and said bushing having beveled engaging surfaces whereby the ring when moved into clamping engagement tends to move the bushing in said slide to closely fit said hub and also holds said turret securely upon the supporting seat therefor carried by said slide.

7. In a screw machine, the combination of a turret, a slide supporting said turret and permitting reciprocation thereof relatively to said slide, a ring for clamping said turret to said slide, a right and left hand screw carried by said ring for moving the same into clamping engagement, and devices for rotating said screw to clamp said ring for each operation of said slide to its working position, one of the threaded portions of said screw comprising an externally threaded sleeve rigidly secured to said screw to facilitate assembling the parts.

8. In a screw machine, the combination of a slide, a turret resting upon said slide and having a vertically extending tapered hub projecting into said slide, a bushing carried by said slide around said hub to form a bearing therefor, a disk carried by the end of said hub, a split ring having threaded ends between said disk and said bushing, a right and left hand screw extending through the threaded ends of said ring, and devices for rotating said screw by each reciprocation of said slide, one of the threaded portions of said screw comprising an externally threaded sleeve rigidly secured to said screw to facilitate assembling the parts.

9. In a screw machine, the combination of a slide, a turret resting upon said slide and having a vertically extending tapered hub projecting into said slide, a bushing carried by said slide around said hub to form a bearing therefor, a disk carried by the end of said hub, a split ring having threaded ends between said disk and said bushing, a right and left hand screw extending through the threaded ends of said ring, an operating dog secured to said screw, and a stationary lug for engaging said dog to rotate said screw and clamp said ring for motion in one direction of said slide and for engaging said dog to turn said screw in the reverse direction for motion in the other direction of said slide, said ring and said bushing having beveled engaging surfaces whereby the ring when moved into clamping engagement tends to move the bushing in said slide to closely fit said hub and also holds said turret securely upon the supporting seat therefor carried by said slide, one of the threaded portions of said screw comprising an externally threaded sleeve rigidly secured to said screw to facilitate assembling the parts.

10. In a screw machine, the combination of a turret, a slide supporting said turret and permitting reciprocation thereof relatively to said slide, a ring for clamping said turret to said slide, a right and left hand screw carried by said ring for moving the same into clamping engagement, devices for rotating said screw to clamp said ring for each operation of said slide to its working position, and a bushing having internal and external threads of different pitch carried by said ring and engaging one of the threaded portions of said screw for adjusting said clamping ring.

11. In a screw machine, the combination of a slide, a turret resting upon said slide and having a vertically extending tapered hub projecting into said slide, a bushing carried by said slide around said hub to form a bearing therefor, a disk carried by the end of said hub, a split ring having threaded ends between said disk and said bushing, a right and left hand screw extending through the threaded ends of said ring, devices for rotating said screw by each reciprocation of said slide, and a bushing having internal and external threads of different pitch carried by said ring and engaging one of the threaded portions of said screw for adjusting said clamping ring.

12. In a screw machine, the combination of a slide, a turret resting upon said slide and having a vertically extending tapered hub projecting into said slide, a bushing carried by said slide around said hub to form a bearing therefor, a disk carried by the end of said hub, a split ring having threaded ends between said disk and said bushing, a right and left hand screw extending through the threaded ends of said ring, an operating dog secured to said screw, a stationary lug for engaging said dog to rotate said screw and clamp said ring for motion in one direction of said slide and for engaging said dog to turn said screw in the reverse direction for motion in the other direction of said slide, said ring and said bushing having beveled engaging surfaces whereby the ring when moved into clamping engagement tends to move the bushing in said slide to closely fit said hub and also holds said turret securely upon the supporting seat therefor carried by said slide, and a bushing having internal and external threads of different pitch carried by said ring and engaging one of the threaded portions of said screw for adjusting said clamping ring.

13. In a screw machine, the combination of a turret, a slide supporting said turret and permitting reciprocation thereof relatively to said slide, a ring for clamping said turret to said slide, a right and left hand screw carried by said ring for moving the same into clamping engagement, devices rotating said screw to clamp said ring for each operation of said slide to its working position, one of the threaded portions of said screw comprising an externally threaded sleeve rigidly secured to said screw to facilitate assembling the parts, and a bushing having internal and external threads of different pitch carried by said ring and engaging one of the threaded portions of said screw for adjusting said clamping ring.

14. In a screw machine, the combination of a slide, a turret resting upon said slide and having a vertically extending tapered hub projecting into said slide, a bushing carried by said slide around said hub to form a bearing therefor, a disk carried by the end of said hub, a split ring having threaded ends between said disk and said bushing, a right and left hand screw extending through the threaded ends of said ring, devices for rotating said screw by each reciprocation of said slide, one of the threaded portions of said screw comprising an externally threaded sleeve rigidly secured to said screw to facilitate assembling the parts, and a bushing having internal and external threads of different pitch carried by said ring and engaging one of the threaded portions of said screw for adjusting said clamping ring.

15. In a screw machine, the combination of a slide, a turret resting upon said slide and having a vertically extending tapered hub projecting into said slide, a bushing carried by said slide around said hub to form a bearing therefor, a disk carried by the end of said hub, a split ring between said disk and said bushing, a right and left hand screw extending through the threaded ends of said ring, an operating dog secured to said screw, a stationary lug for engaging said dog to rotate said screw and clamp said ring for motion in one direction of said slide and for engaging said dog to turn said screw in the reverse direction for motion in the other direction of said slide, said ring and said bushing having beveled engaging surfaces whereby the ring when moved into clamping engagement tends to move the bushing in said slide to closely fit said hub and also holds said turret securely upon the supporting seat therefor carried by said slide, one of the threaded portions of said screw comprising an externally threaded sleeve rigidly secured to said screw to facilitate assembling the parts, and a bushing having internal and external threads of different pitch carried by said ring and engaging one of the threaded portions of said screw for adjusting said clamping ring.

16. In a screw machine, the combination of a turret, a slide supporting said turret and permitting reciprocation thereof relatively to said slide, a ring for clamping said turret to said slide, a right and left hand screw carried by said ring for moving the same into clamping engagement, devices rotating said screw to clamp said ring for each operation of said slide to its working position, one of the threaded portions of said screw comprising an externally threaded sleeve rigidly secured to said screw to facilitate assembling the parts, a bushing having internal and external threads of different pitch carried by said ring and engaging one of the threaded portions of said screw for adjusting said clamping ring, and clamping mechanism carried by said ring for holding said threaded sleeve in any desired adjustment.

17. In a screw machine, the combination of a slide, a turret resting upon said slide and having a vertically extending tapered hub projecting into said slide, a bushing carried by said slide around said hub to form a bearing therefor, a disk carried by the end of said hub, a split ring between said disk and said bushing, a right and left hand screw extending through the threaded ends of said ring, devices for rotating said screw by each reciprocation of said slide, one of the threaded portions of said screw comprising an externally threaded sleeve rigidly secured to said screw to facilitate assembling the parts, a bushing having internal and external threads of different pitch carried by said ring and engaging one of the threaded portions of said screw for adjusting said clamping ring, and clamping mechanism carried by said ring for holding said threaded sleeve in any desired adjustment.

18. In a screw machine, the combination of a slide, a turret resting upon said slide and having a vertically extending tapered hub projecting into said slide, a bushing carried by said slide around said hub to form a bearing therefor, a disk carried by the end of said hub, a split ring between said disk and said bushing, a right and left hand screw extending through the threaded ends of said ring, an operating dog secured to said screw, a stationary lug for engaging said dog to rotate said screw and clamp said ring for motion in one direction of said slide and for engaging said dog to turn said screw in the reverse direction for motion in the other direction of said slide, said ring and said bushing having beveled engaging surfaces whereby the ring when moved into clamping engagement tends to move the bushing in said slide to closely fit said hub and also holds said turret securely upon the supporting seat therefor carried by said slide, one of the threaded portions of said screw comprising an externally threaded sleeve rigidly secured to said screw to facilitate assembling the parts, a bushing having internal and external threads of different pitch carried by said ring and engaging one of the threaded portions of said screw for adjusting said clamping ring, and clamping mechanism carried by said ring for holding said threaded sleeve in any desired adjustment.

19. In a screw machine, the combination of a saddle, a slide carried by the saddle and capable of reciprocation thereon, a turret rotatably carried by the slide, driving teeth carried by and extending from the turret, an operating latch for engaging said teeth to rotate the turret by reciprocation of said slide, a horizontal pivot rod carried by the saddle for said latch, a spring tending to hold said latch in the path of said teeth, and a holding latch for engaging said teeth to limit the rotation of the turret by the operating latch, said holding latch having locking surfaces engaging a plurality of said teeth.

20. In a screw machine, the combination of a saddle, a slide carried by the saddle and capable of reciprocation thereon, a turret rotatably carried by the slide, driving teeth carried by and extending from the turret, an operating latch for engaging said teeth to rotate the turret by reciprocation of said slide, a horizontal pivot rod carried by the saddle for said latch, a spring tending to hold said latch in the path of said teeth, and a holding latch for engaging said teeth to limit the rotation of the turret by the operating latch, said holding latch having locking surfaces engaging a plurality of said teeth, said locking surfaces and the faces of said teeth being beveled, and a spring tending to move said holding latch to its locking position, whereby said beveled surfaces coöperating to aline said turret angularly.

21. In a screw machine, the combination of a saddle, a slide carried by the saddle and capable of reciprocation thereon, a turret rotatably carried by the slide, driving teeth carried by and extending from the turret, an operating latch for engaging said teeth to rotate the turret by reciprocation of said slide, a horizontal pivot rod carried by the saddle for said latch, a spring tending to hold said latch in the path of said teeth, a holding latch for engaging said teeth to limit the rotation of the turret by the operating latch, a releasing dog associated with the holding latch, and devices actuating said releasing dog when the slide is moved away from the work, the operation of said releasing dog serving to move the holding latch from its locking position to clear said teeth.

22. In a screw machine, the combination of a saddle, a slide carried by the saddle and capable of reciprocation thereon, a turret rotatably carried by the slide, driving teeth carried by and extending from the turret, an operating latch for engaging said teeth to rotate the turret by reciprocation of said slide, a horizontal pivot rod carried by the saddle for said latch, a spring tending to hold said latch in the path of said teeth, a holding latch for engaging said teeth to limit the rotation of the turret by the operating latch, said holding latch having locking surfaces engaging a plurality of said teeth, a releasing dog for moving said holding latch to a position clear of said teeth, and a device carried by said saddle for operating said releasing dog when the slide is moved away from the work and releasing said dog before the turret is completely rotated to its next operative position.

23. In a screw machine, the combination of a saddle, a slide carried by the saddle and capable of reciprocation thereon, a turret rotatably carried by the slide, driving teeth carried by and extending from the turret, an operating latch for engaging said teeth to rotate the turret by reciprocation of said slide, a horizontal pivot rod carried by the saddle for said latch, a spring tending to hold said latch in the path of said teeth, a holding latch for engaging said teeth to limit the rotation of the turret by the operating latch, said holding latch having locking surfaces engaging a plurality of said teeth, said locking surfaces and the faces of said teeth being beveled, a spring tending to move said holding latch to its locking position, whereby said beveled surfaces coöperate to aline said turret angularly, a releasing dog for moving said holding latch to a position clear of said teeth, and a device carried by said saddle for operating said releasing dog when the slide is moved away from the work and releasing said dog before the turret is completely rotated to its next operative position.

24. In a screw machine, the combination of a saddle, a slide carried by the saddle and capable of reciprocation thereon, a turret rotatably carried by the slide, driving teeth carried by and extending from the turret, an operating latch for engaging said teeth to rotate the turret by reciprocation of said slide, a horizontal pivot rod carried by the saddle for said latch, a spring tending to hold said latch in the path of said teeth, a holding latch for engaging said teeth to limit the rotation of the turret by the operating latch, said holding latch having locking surfaces engaging a plurality of said teeth, a releasing dog for moving said holding latch to a position clear of said teeth, a device carried by said saddle for operating said releasing dog when the slide is moved away from the work and releasing said dog before the turret is completely rotated to its next operative position, a split clamping ring for clamping the turret in any desired angular position, a screw extending through the ends of said clamping ring, and devices for turning said screw to release said clamping ring when the slide is moved away from the work and before engagement of the operating latch with the teeth, said turning devices operating during forward movement of the slide to clamp the turret upon the slide.

25. In a screw machine, the combination of a saddle, a slide carried by the saddle and capable of reciprocation thereon, a turret rotatably carried by the slide, driving teeth carried by and extending from the turret, an operating latch for engaging said teeth to rotate the turret by reciprocation of said slide, a horizontal pivot rod carried by the saddle for said latch, a spring tending to hold said latch in the path of said teeth, a holding latch for engaging said teeth to limit the rotation of the turret by the operating latch, said holding latch having locking surfaces engaging a plurality of said teeth, said locking surfaces and the faces of said teeth being beveled, a spring tending to move said holding latch to its locking position, whereby said beveled surfaces coöperate to aline said turret angularly, a releasing dog for moving said holding latch to a position clear of said teeth, a device carried by said saddle for operating said releasing dog when the slide is moved away from the work and releasing said dog before the turret is completely rotated to its next operative position, a split clamping ring for clamping the turret in any desired angular position, a screw extending through the ends of said clamping ring, and devices for turning said screw to release said clamping ring when the slide is moved away from the work and before engagement of the operating latch with the teeth, said turning devices operating during forward movement of the slide to clamp the turret upon the slide.

26. In a screw machine, the combination of a saddle, a slide carried by the saddle and capable of reciprocation thereon, a turret rotatably carried by the slide, driving teeth carried by and extending from the turret, an operating latch for engaging said teeth to rotate the turret by reciprocation of said slide, a horizontal pivot rod carried by the saddle for said latch, a spring tending to hold said latch in the path of said teeth, a holding latch for engaging said teeth to limit the rotation of the turret by the operating latch, said holding latch having locking surfaces engaging a plurality of said teeth, a releasing dog for moving said holding latch to a position clear of said teeth, a device carried by said saddle for operating said releasing dog when the slide is moved away from the work and releasing said dog before the turret is completely rotated to its next operative position, a split clamping ring for clamping the turret in any desired angular position, a screw extending through the ends of said clamping ring, devices for turning said screw to release said clamping ring when the slide is moved away from the work and before engagement of the operating latch with the teeth, said turning devices operating during forward movement of the slide to clamp the turret upon the slide, and a disk carried by the turret for supporting said clamping ring between said disk and said slide, said clamping ring having a beveled surface engaging a similar surface carried by the slide whereby moving said ring to its clamping position draws said turret firmly against its supporting seat carried by the slide.

27. In a screw machine, the combination of a saddle, a slide carried by the saddle and capable of reciprocation thereon, a turret rotatably carried by the slide, driving teeth carried by and extending from the turret, an operating latch for engaging said teeth to rotate the turret by reciprocation of said slide, a horizontal pivot rod carried by the saddle for said latch, a spring tending to hold said latch in the path of said teeth, a holding latch for engaging said teeth to limit the rotation of the turret by the operating latch, said holding latch having locking surfaces engaging a plurality of said teeth, said locking surfaces and the faces of said teeth being beveled, a spring tending to move said holding latch to its locking position, whereby said beveled surfaces coöperate to aline said turret angularly, a releasing dog for moving said holding latch to a position clear of said teeth, a device carried by said saddle for operating said releasing dog when the slide is moved away from the work and releasing said dog before the turret is completely rotated to its next operative position, a split clamping ring for clamping the turret in any desired angular position, a screw extending through the ends of said clamping ring, devices for turning said screw to release said clamping ring when the slide is moved away from the work and before engagement of the operating latch with the teeth, said turning devices operating during forward movement of the slide to clamp the turret upon the slide, and a disk carried by the turret for supporting said clamping ring between said disk and said slide, said clamping ring having a beveled surface engaging a similar surface carried by the slide whereby moving said ring to its clamping position draws said turret firmly against its supporting seat carried by the slide.

In witness whereof, I hereunto subscribe my name this 13th day of December, A. D. 1916.

AUGUST J. MEYER.